(12) United States Patent
Shannon et al.

(10) Patent No.: US 9,288,444 B2
(45) Date of Patent: Mar. 15, 2016

(54) SYSTEM AND METHOD FOR VIDEO SIGNAL DELIVERY

(75) Inventors: Terry Shannon, Montreal (CA); Alan Doherty, Montreal (CA); David Gill, Montreal (CA); Jacques Desroches, Montreal (CA)

(73) Assignee: BCE Inc., Montreal (CA)

( * ) Notice: Subject to any disclaimer, the term of this patent is extended or adjusted under 35 U.S.C. 154(b) by 1207 days.

(21) Appl. No.: 12/511,672

(22) Filed: Jul. 29, 2009

(65) Prior Publication Data

US 2010/0169943 A1 Jul. 1, 2010

Related U.S. Application Data

(60) Provisional application No. 61/141,476, filed on Dec. 30, 2008.

(51) Int. Cl.
| | |
|---|---|
| *H04N 7/173* | (2011.01) |
| *H04N 21/4223* | (2011.01) |
| *H04N 21/472* | (2011.01) |
| *H04N 21/488* | (2011.01) |
| *H04M 11/02* | (2006.01) |

(52) U.S. Cl.
CPC ........ *H04N 7/17318* (2013.01); *H04N 21/4223* (2013.01); *H04N 21/47202* (2013.01); *H04N 21/4882* (2013.01); *H04M 11/025* (2013.01)

(58) Field of Classification Search
CPC ........... H04L 12/2801; H04N 7/17309; H04N 21/6118; H04N 21/4622; H04N 21/8586; H04N 7/17318; H04N 21/4782; H04N 21/4722; H04N 21/4126; H04N 5/44543; H04N 7/163; H04N 21/42204; H04N 5/4401; H04N 5/44; H04N 5/775; H04N 21/4113; H04H 20/79; H04H 60/97
USPC ............. 379/142.15–142.17, 88.13; 348/552; 725/74, 82–83, 106
See application file for complete search history.

(56) References Cited

U.S. PATENT DOCUMENTS

| | | | | |
|---|---|---|---|---|
| 3,816,662 | A | * | 6/1974 | Shaver et al. ............... 348/14.11 |
| 5,612,994 | A | * | 3/1997 | Chen ......................... 379/167.12 |
| 6,049,598 | A | * | 4/2000 | Peters et al. .............. 379/102.06 |
| 6,748,061 | B2 | | 6/2004 | Ahlstrom et al. |

(Continued)

OTHER PUBLICATIONS

Axis Network Cameras, Technical Overview, available at http://www.axis.com/files/tech_overview/2120_to.pdf, Axis Communications, Jul. 3, 2000.

(Continued)

*Primary Examiner* — Ngoc Vu
(74) *Attorney, Agent, or Firm* — Curtis B. Behmann; Borden Ladner Gervais LLP

(57) ABSTRACT

A system for delivering a video signal associated with an access request, wherein the system includes: a trigger module configured to detect a trigger event associated with the access request; a video module configured to access a video signal related to the trigger event; and a control module configured to control the video module to access the video signal based on the trigger event and for outputting the accessed video signal. A corresponding method for delivering a video signal associated with an access request, wherein the method includes: detecting a trigger event associated with the access request at a video device; accessing a video signal related to the trigger event; and displaying the video signal via the video device.

18 Claims, 5 Drawing Sheets

(56) References Cited

U.S. PATENT DOCUMENTS

| | | |
|---|---|---|
| 7,015,943 B2 | 3/2006 | Chiang |
| 7,263,182 B2 * | 8/2007 | Allen et al. ............. 379/215.01 |
| 2003/0028884 A1 * | 2/2003 | Swart et al. .................... 725/51 |
| 2004/0057567 A1 * | 3/2004 | Lee .......................... 379/167.01 |
| 2005/0010649 A1 | 1/2005 | Payne et al. |
| 2007/0115390 A1 * | 5/2007 | Makara et al. ................ 348/552 |

OTHER PUBLICATIONS

Canadian Patent Application No. 2,674,203, Office Action dated Sep. 28, 2015.

* cited by examiner

SYSTEM AND METHOD FOR VIDEO SIGNAL DELIVERY

FIELD

This application relates to a system and method for video signal delivery, and in particular, to a system and method for delivering a video signal to a user in an access control system. The system and method can be particularly applicable to visitor announcement systems in multi-dwelling unit (MDUs) such as residential condominiums or apartments.

BACKGROUND

Video signals are used in many applications, including security, TV, Internet entertainment, and the like. Closed Circuit Television (CCTV) is an application that allows a video signal from a camera to be viewed by a person/user on a television set, typically at a nearby location. For example, a building may have one or more video cameras on the outside or at entry points for security purposes and a user views the video signal from the cameras on a TV inside the building. In this context, CCTV systems may be used for security purposes in commercial or residential buildings where the CCTV feed is typically monitored by security personnel or an automated system. CCTV is also used, for example, by residents of a multi-dwelling unit (MDU), such as a condominium or apartment building, to view an internal video signal (video feed) provided from one or more security cameras at the building entrance(s) allowing the residents to view visitors before determining whether or not to let the visitor enter the building.

In most residential and some commercial applications, CCTV signals are typically provided through television channels. Cable companies providing an analog television service to customers living in MDUs often offer to integrate the local CCTV signal in their own cable feed. This is usually accomplished by filtering the incoming cable television signal to remove one channel therefrom and substituting in its place the properly modulated CCTV signal before distribution to the subscribing unit of the MDU. In this situation, subscribers/residents can tune into a dedicated channel providing continuous lobby entrance real time video feed. Any resident can view the camera at any given time, and see who is at the MDU lobby.

When dealing with fully digital TV, this approach can be more difficult, because a locally connected CCTV signal cannot efficiently be simultaneously broadcast to all units of an MDU. Further, as the incoming digital signal is only decoded at the set top box in each subscribing unit. In order to properly encode the CCTV signal and integrate it in the regular digital television feed, one approach has been to send the local, unencoded CCTV signal from the MDUs to the closest headend, where the CCTV signals from all the subscribing MDUs serviced by the same headend are digitally encoded and multiplexed with the entire broadcasted digital television feed. From there, the resulting television feed is sent to all subscribing customers through various central offices. Although only the units of a particular MDU are allowed to see the CCTV signal from their local camera, the same signal is actually received by every subscriber in a large area, creating a waste of bandwidth, and making this technique difficult to apply to a large scale.

There remains a need for an efficient and relatively simple system and method for providing video signal delivery, particularly in the case of physical access control systems.

SUMMARY

According to an aspect of this application, there is provided a method for delivering a video signal associated with an access request, wherein the method includes: detecting a trigger event associated with the access request at a video device; accessing a video signal related to the trigger event; and displaying the video signal via the video device.

In a particular case, the method may further include, prior to outputting the video signal, notifying a user of the availability of the video signal and providing an option to display the video signal. In this case, the notification may further include instructions for the user to access the display of the video signal.

In another particular case, the detecting a trigger event may include: detecting a ring tone on a telephone line; detecting a caller identification for the call associated with the ring tone; and determining if the caller identification matches with a predetermined caller identification associated with an access request.

In yet another particular case, the accessing a video signal may include changing to a channel related to the video signal.

In still yet another particular case, the accessing a video signal may include connecting to a predetermined streaming video.

In another particular case, the displaying the video signal via the video device may include outputting the video signal to a display device associated with the video device.

According to another aspect of the application, there is provided a system for delivering a video signal associated with an access request, wherein the system includes: a trigger module configured to detect a trigger event associated with the access request; a video module configured to access a video signal related to the trigger event; and a control module configured to control the video module to access the video signal based on the trigger event and for outputting the accessed video signal.

In a particular case, the control module may be further configured to, prior to outputting the video signal, notify a user of the availability of the video signal and provide an option to output the video signal.

In a particular case, the notification may further include instructions for the user to access the display of the video signal.

In another particular case, the trigger module may be configured to detect a trigger event by: detecting a ring tone on a telephone line; detecting a caller identification for the call associated with the ring tone; and determining if the caller identification matches with a predetermined caller identification associated with an access request.

In some cases, the video module may be configured to access a video signal by changing to a channel related to the video signal or by connecting to a predetermined streaming video or the like.

In yet another particular case, the control module may be configured to display the video signal by outputting the video signal from the video module to a display device associated with the video device.

According to another aspect of the application, there is provided a computer readable medium including instruction, which, when executed on a computing device, cause the computing device to perform the method including: detecting a trigger event associated with the access request at a video device; accessing a video signal related to the trigger event; and displaying the video signal via the video device.

In some aspects, embodiments of the systems and methods herein may be included in set top boxes, mobile phones, or computing devices such as personal computers and the like.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which.

DETAILED DESCRIPTION

Figure 1:
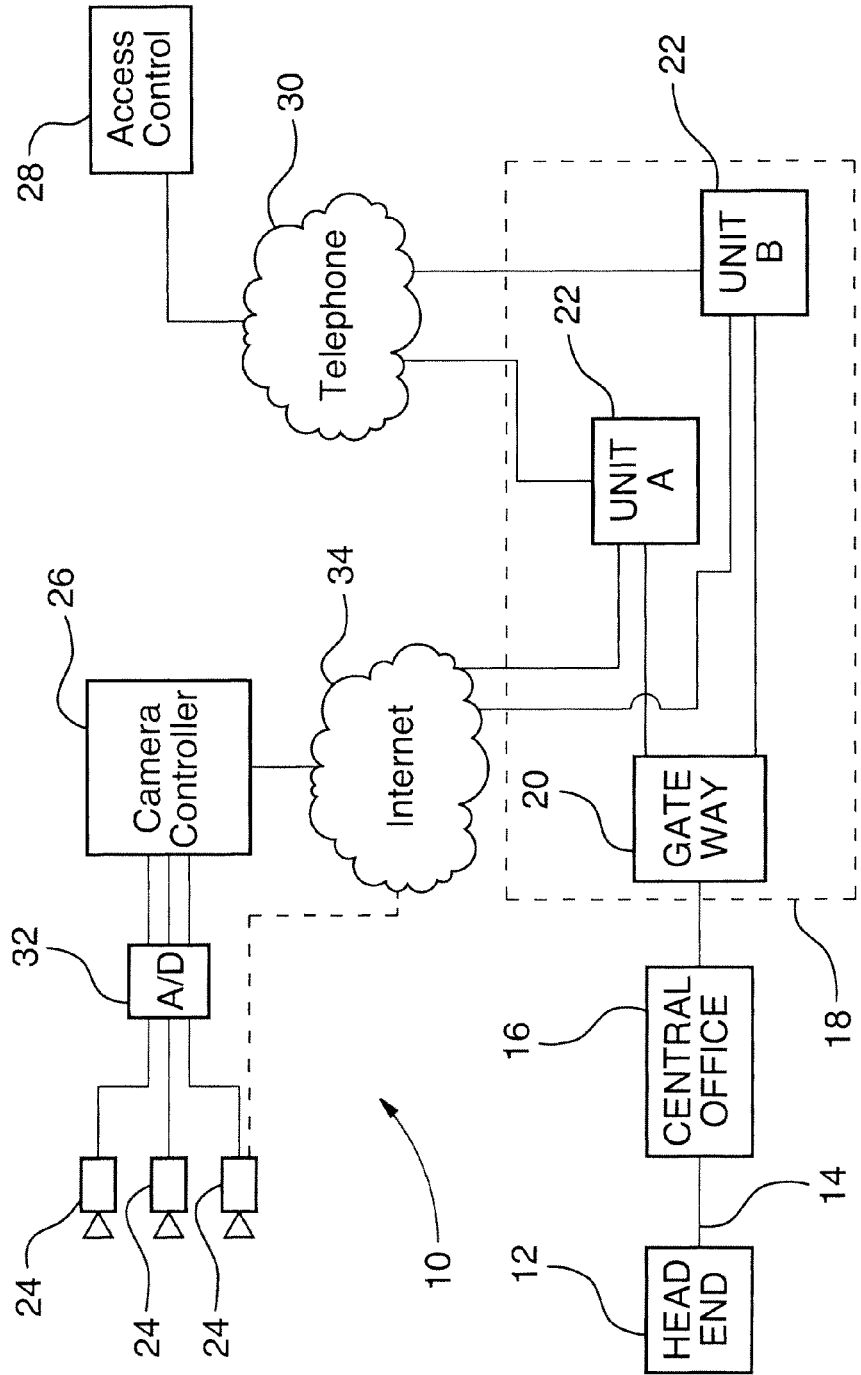
FIG. 1 is a block diagram of an example embodiment of a television and video signal delivery system in an MDU.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Generally speaking, the embodiments described herein are intended to allow for a simplified system and method of delivering a video signal showing a person that is seeking access to a multi-dwelling unit (MDU) to residents of the MDU, particularly in a digital environment. In these embodiments, a video system can be installed on one or more of various video devices, such as a set top box, and the video will control the video device to request a connection to a video camera located locally in the MDU lobby based on a triggering event. The triggering event may be a request for contact/entry into the MDU, such as an entry code entered at a lobby entrance of an MDU. The triggering event typically initiates a call to the resident so the resident may speak to the person at the door. In the embodiments, the video device is also configured to receive the triggering event (for example, by being connected to the telephone line that is used to receive the call), so that the video device can detect that the incoming call is from the front lobby, for example, based on the incoming caller identification (CLID). As soon as the CLID has been identified, the video system on the video device will request a connection with the live feed from the camera located in the MDU front lobby. The lobby view can thus be very quickly displayed on or via the video device.

FIG. 1 is a block diagram of an example embodiment of a television and video delivery system 10. In this embodiment, the system 10 is applied in the context of Very-high-rate Digital Subscriber Line (VDSL) television delivery It will however be understood that this particular embodiment is given by way of example and that the system 10 may be used with other types of television signals (sometimes referred to as television feeds). VDSL is an example of xDSL technology and can be used for the delivery of television or video signals. VDSL technology is often used to allow subscribers to receive digital television in places where it is not feasible, desirable, or allowed to install a satellite dish. VDSL uses DSL line code modulated on a copper distribution pair to deliver digital broadband signals. In an MDU environment, digital broadcast television is typically part of a broadband signal delivered to resident subscribers via the copper riser pair.

As shown in FIG. 1, digital broadcast television signals originate from a head end 12 from which the video signal is formatted according to a protocol compatible with the VDSL distribution system. An exemplary protocol compatible with the VDSL distribution system is the MPEG2/4 format. From the head end 12, encoded broadcast television signals are transported through a transport system 14, typically an optical fiber Dense Wavelength Division Multiplexing (DWDM) system or other appropriate telecommunication system, to various central offices 16, each providing and managing the distribution of television channels to subscribers. For example, a particular central office 16 may provide services to a plurality of neighboring MDUs 18 (one shown) or homes. Each central office 16 typically manages It will be noted that in some cases the central office 16 may be located locally at an MDU 18, as is for example possible for very large MDUs where such a financial investment is warranted. Alternatively, as shown in FIG. 1, at least one gateway 20 may be provided at the MDU's 18 premises. The gateway 20 may be embodied by an ONU (Optical Network Unit) providing the incoming digital television feed over an existing copper infrastructure and distributing it to each subscribing unit 22 (two shown) of the MDU 18.

The system 10 shown in FIG. 1 further includes one or more CCTV cameras 24 and a camera controller 26. The CCTV cameras 24 may be installed at appropriate locations in a building or building complex such as MDU 18. It will be understood that the CCTV cameras 24 and camera controller 26 may be internal or external to the MDU 18. In cases where multiple cameras 24 are provided, the video signal from the multiple cameras may be sequenced by a video sequencer to be viewed on a same screen/channel, or each camera 24 may be provided so that it may be viewed on its own screen/channel. Alternatively, the video signal from the multiple cameras 24 could be arranged to be shown together in a single screen/channel with multiple video signals. Typically, such CCTV cameras 24 are located in the lobby or other entrance area of on MDU 18 so that its residents may be able to see and identify visitors before letting them in. The signal from the CCTV camera 24 may be analog or digital. It will be noted that for most applications, the CCTV camera 24 need not provide a high definition image. As a matter of fact, existing CCTV cameras 24 often provide a low resolution image, as the images are not meant for prolonged viewing. New dedicated cameras may be installed when setting up the present system 10, or the system 10 may be connected to pre-existing cameras. It will be understood that newer cameras that are not specifically called CCTV cameras may also be used.

Referring to FIG. 1, in one embodiment, the camera controller 26 is embodied by a personal computer (PC). The camera controller 26 may of course be embodied by any other appropriate computer system, and may or may not be provided with peripheral components such as a keyboard and display screen, printer, data reader, etc, depending on the need for such components in a given embodiment.

The MDU 18 will also generally have an access control panel 28 at which visitors may enter a code indicating the resident to be contacted. The access control panel 28 receives the code and uses a look-up or the like to determine a contact number for the respective resident and dials a connection to the resident. The connection to the resident is often made through a telephone network 30 on either an MDU-based network or the public telephone network. The connection may also be made through a wireless network to a mobile phone.

The camera controller 26 is in communication with the CCTV camera 24, for example through a baseband connection, to receive the video signal therefrom. A video capture application (not shown) may be provided in the camera controller 26 to pre-process the video signal, as needed. If the video signal is analog, then it may be converted to a digital video signal by a separate analog to digital converter 32 or through the video capture application. As a simple example, the video capture application may encode the video signal at 15 fps, which is generally considered a sufficient image quality for the limited viewing such an image typically receives. The resulting image may be re-sized or otherwise processed, if necessary. The camera controller 26 then streams or transmits the video signal through, for example, a network 34, which may be a LAN, WAN or the Internet. In particular, the video signal may be made available through a web server/site/camera that may be hosted locally or through a service provider or the like. In a particular case, the video signal may be transmitted to and hosted by a central office or other location, such as a Video Operation Center (VOC) (not shown) in the case of XDSL television services, in order to host the video stream of the video signal to the residents. The transmission may be through a communication device (not shown) such as any appropriate modem (not shown), provided in communication with the camera controller 26.

In a particular case, the camera controller 26 may not be continually streaming the video signal but may only begin streaming the video signal following receipt of a notification from the access control panel 28. In this manner, the notification may cause the camera controller 26 to begin receiving the video signal from the CCTV camera 24 and to begin streaming the video.

Figure 2:
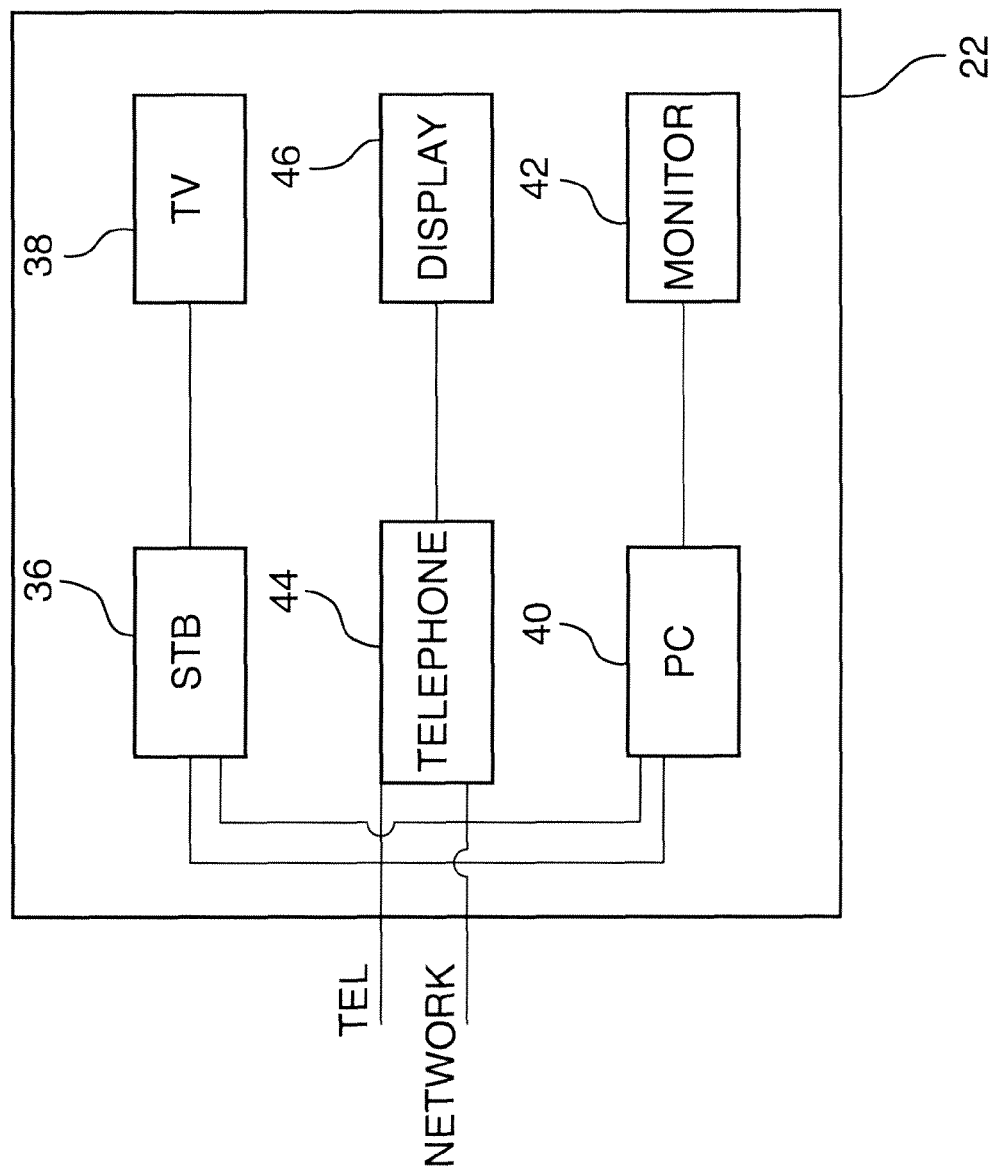
FIG. 2 is a block diagram of an example configuration of a unit in an MDU.

FIG. 2 is a block diagram of an example configuration of video devices in a resident unit 22. Each resident unit 22 may have video devices such as a set top box (STB) 36, typically coupled with a TV 38, a personal computer 40 or similar device, typically coupled with a monitor 42, and a telephone 44. In some cases, the telephone 44 may also have some capability for displaying video via a display device 46. Each of these elements, the STB 36, the personal computer 40 and the telephone 44 are connected to the telephone network 30 and may also be connected to a network 34, such as the Internet, through a modem/telephone line or an Internet connection of some other type. The telephone may be wired or wireless phone. In particular, most mobile phones are also provided with display devices and can be connected to networks such as the Internet.

Figure 3:
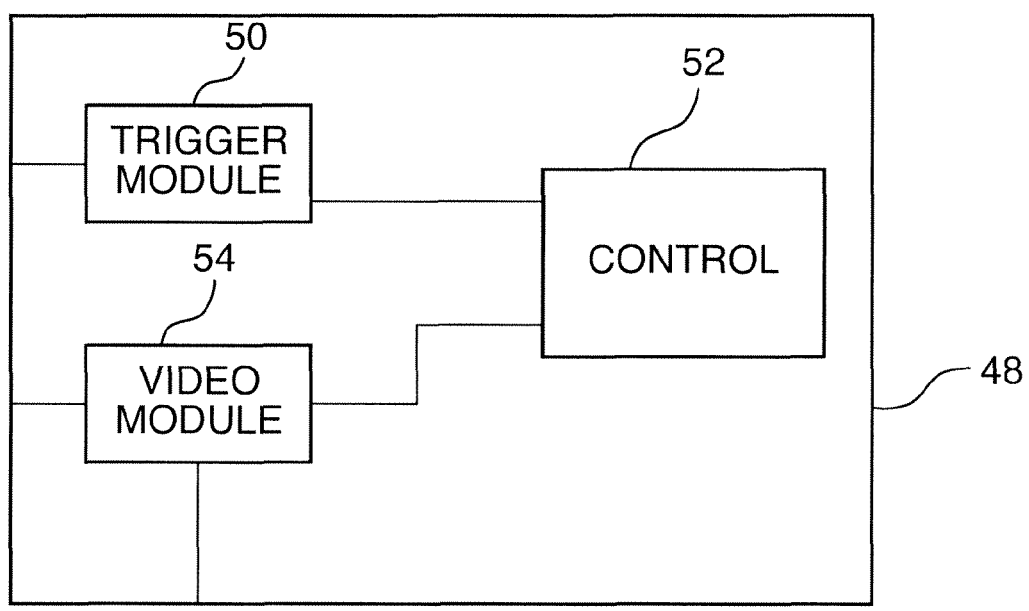
FIG. 3 is a block diagram of a video system for video signal delivery.

In this embodiment, the STB 36, personal computer 40 or telephone 44 are provisioned with a video system 48 for delivering a video signal such as that shown in FIG. 3. The video system 48 system includes a trigger module 50 that receives a trigger event via the telephone network 30, a controller 52 that receives information related to the trigger event from the trigger module 50 and based on the information, causes a video module 54 to begin streaming video received from the video controller 26 via network 34. The operation of the video system 48 is explained in further detail below with reference to FIG. 4. It will be understood that the video system 34 may be implemented in software or hardware and that the software may be distributed on a computer readable medium or through a network.

Figure 4:
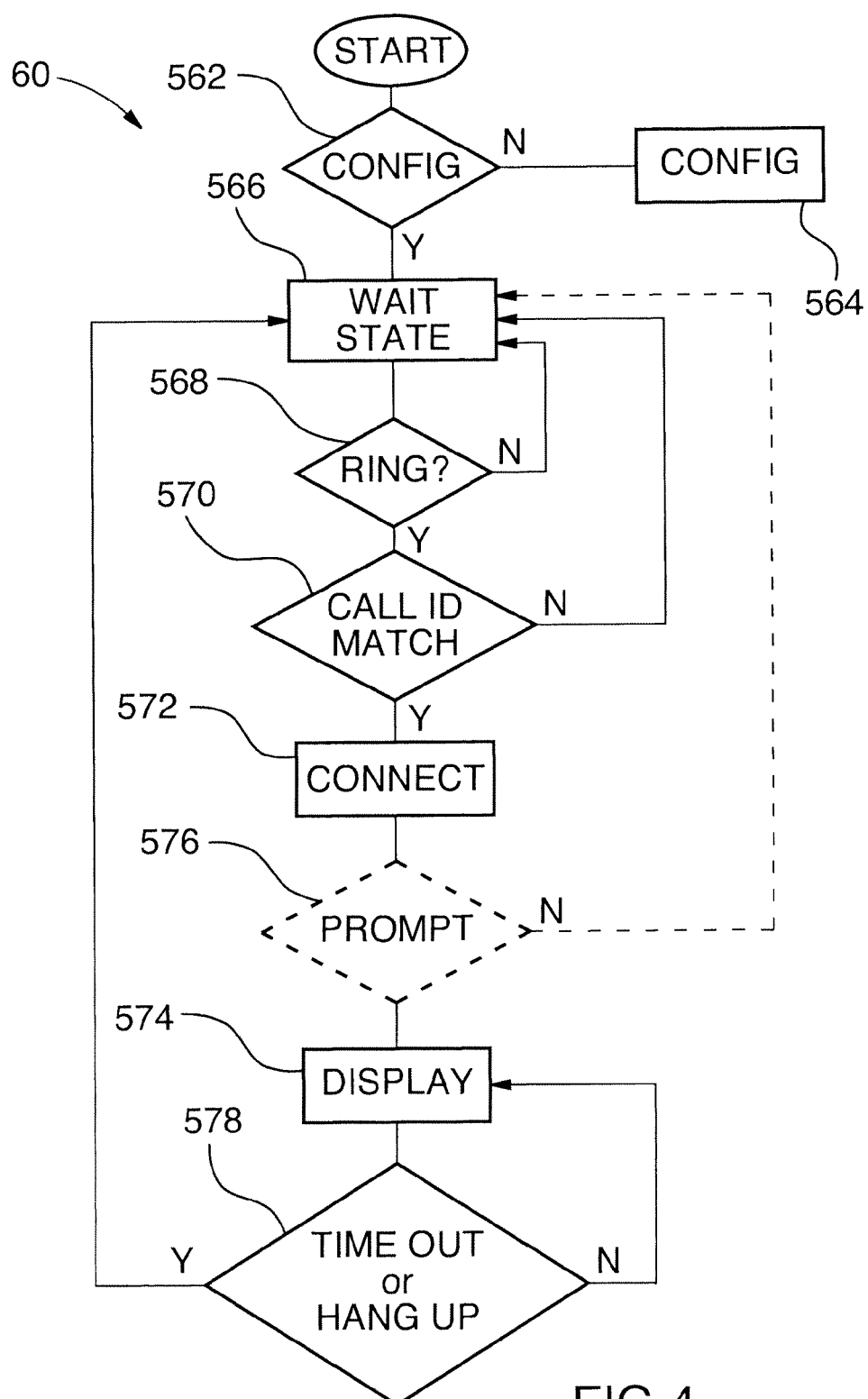
FIG. 4 is a flowchart of a method of video signal delivery.

FIG. 4 is a flow chart of an example method 60 for video signal delivery. On start-up, the method 60 begins by determining whether or not the video system 48 has been configured (S62). If the video system 48 is not fully configured, the system moves to a configuration process (S64). The configuration process (S64) allows the entering of information such as the caller ID of the access control panel 28 and the location of the streaming video, for example a uniform resource locator or the like. When the user leaves the configuration process (S64), a check is again made as to whether configuration has been completed. If configuration has been completed, the method moves into a wait state (S66). In the wait state (S66), the video system 88 monitors for a ring on the telephone connection (S68). When a ring is detected, the video system 48 wakes and (S70) proceeds to monitor the caller ID information received through the telephone connections. The video system 48 compares the caller ID to the caller ID entered during the configuration process (S70). If there is not a match, the video system 48 returns to the wait state (S66). If there is a match, the video system 48 proceeds to connect to the streaming video (S72). In a particular case, the connection may be to a particular uniform resource locator (URL) such as those typically used on the Internet. The video system 48 then proceeds to display the images received based on the connection (S74). In some cases, the system may be set to automatically activate the display device (TV, PC monitor, or other display) in order to show the video stream. In other cases, the video stream may only be displayed if the display device is already activated or based on a prompt/response by the resident/user (S76). In the prompt/response method, the user may also be given an option as to whether or not to view the display or may be advised of the steps needed to be taken to be able to view the display. For example, the user may be prompted to change to a particular channel on a TV to view the display. The video system 48 then determines if there has been a hang-up with regard to the telephone connection or if there has been a predetermined amount of time elapsed or some other indicator that the video stream is no longer required (S78). If this is the case, the method will return to the wait state (S66). As will be understood, the predetermined time or other criteria may be set during the configuration of the system. The video system and method herein allow for a faster more convenient display of the video stream during an access request. The use of video streaming via a network to only units needing to view the video signal also reduces band width usage.

Figure 5:
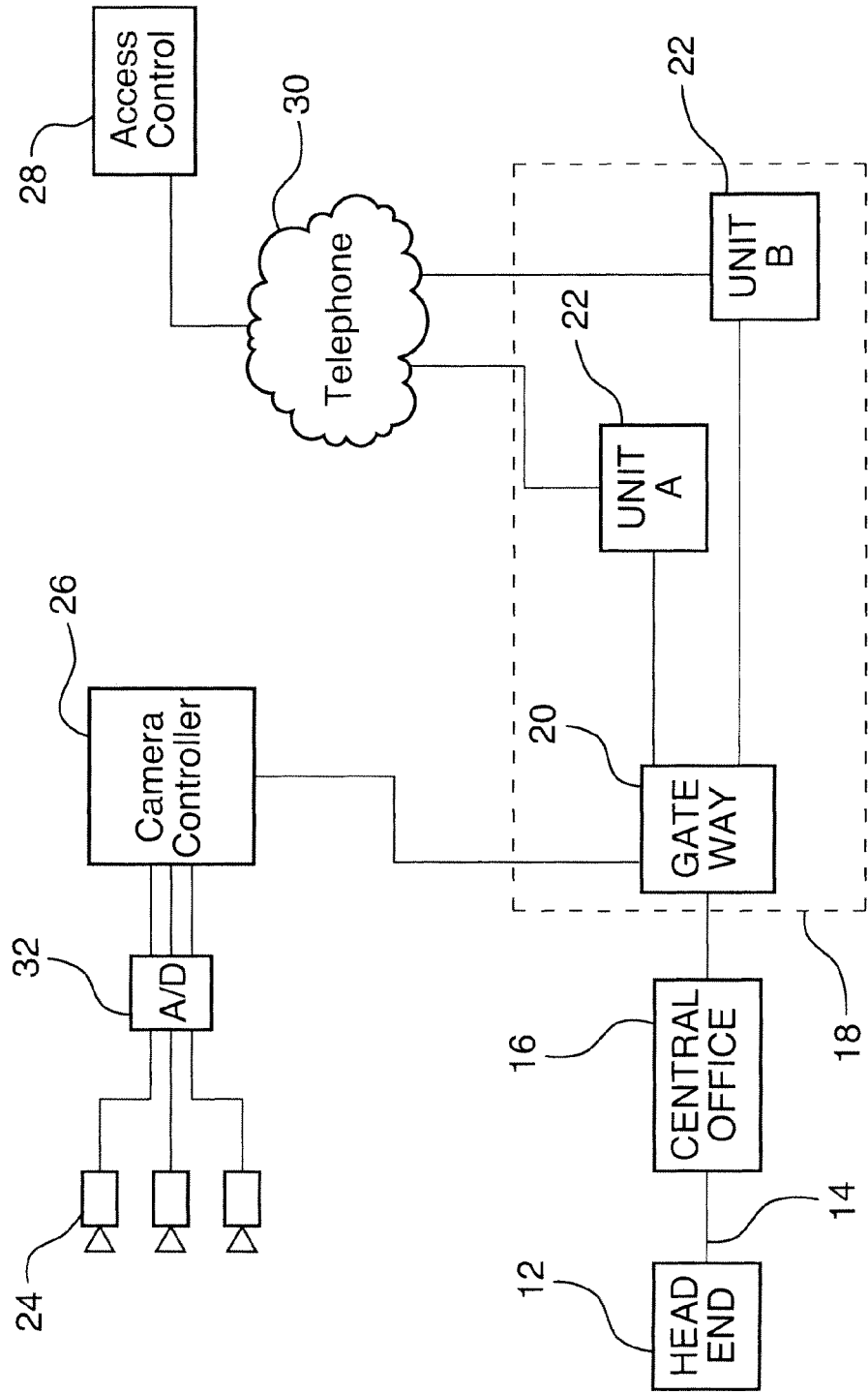
FIG. 5 is a block diagram of an alternate embodiment of a television and video signal delivery system in an MDU.

FIG. 5 shows an alternate embodiment of the television and video signal delivery systems. In FIG. 5, the video signal may be sent by the camera controller 26 to, for example, the central office 16 or gateway 18 for inclusion in the digital television feed.

In order to forward the video signal to the central office 16 or gateway 18, the camera controller 26 may digitally encode the video signal for transport through the appropriate communication lines, such as for example a VDSL line. In one non-limiting example, the video signal may be transmitted through the upstream bandwidth of a VDSL line providing the digital television feed to the subscribers of the MDU. In such a case, the physical interface between the camera controller 26 and the VDSL upstream may be a VDSL Ethernet modem (not shown) connected to the camera controller 26. For example, the encoded video signal may be encapsulated over UDP over Ethernet. Alternatively, the video signal may be forwarded to the central office 16 or gateway 18 through a different communication line such as a dial-up connection, a high speed, DSL, cable or wireless internet connection, etc.

Once the central office 16 or gateway 18 receives the video signal, the central office 16 or gateway 18, integrates the video signal in a dedicated channel of the digital television feed. For example, the video signal may be mapped to a port of a central office terminal (not shown), which carries the broadcast TV channels. The dedicated channel will therefore be carried to every MDU receiving a digital television feed from this particular central office 16. It will be noted that with this embodiment, the video signal from a given MDU is transmitted to all subscribers managed by the same central office 16. The central office 16 may include an authorization module (not shown) operable to only authorize the units of the target MDU to access this dedicated channel, in the same manner as subscriptions to regular broadcast television channels are managed. In this case, the video signal may for example appear scrambled to other subscribers receiving the television feed from the same central office 16. Alternatively, the subscribers of a given central office 16 may be divided into sub-sets of subscribers which may each receive a dedicated video signal destined specifically thereto. The central office 16 may manage the authorizing process to ensure that only the appropriate subscribers are able to view any given video signal, for example, by assigning a different dedicated channel to the video signal of each MDU connected to a given central office 16. In this case, the same channel could be used for the video signal of a MDU connected to another central office, which reduces the necessary bandwidth to upscale the implementation of digital video signal services. This alternative can be expanded to the point that each subscriber receives a personal video signal.

It will be apparent to one skilled in the art that all of the residents of a MDU or building need not all subscribe to a same television service in order to receive the video signal. For example, a portion of the residents of a MDU may receive the video signal via streaming video, while another portion may receive as part of a VDSL television feed, or even as an analog television feed. In such a case, the video signal may be generated by a same camera controller 26, streamed to a network 34, and connected to both the VDSL line and to the incoming analog television feed to directly insert the video signal therein. Alternatively, two different camera controllers 26 may be provided. In the case of analog television feed, the analog video signal can be forwarded to a modulator (not shown), which modulates the video signal according to a modulation format corresponding to a dedicated channel of the analog television feed at which the video signal is to be viewed. The modulator is connected to the incoming analog television feed before its distribution to the different subscribers, and the modulated analog video signal is inserted in the analog cable television feed. Upstream of this connection, a filter (not shown) may be provided to remove the original signal associated to the dedicated channel from the analog television feed. The dedicated channel may be selected so that it does not correspond to a channel already dedicated to a broadcast feed. In one embodiment, the television feed deliberately includes one or more free channels for assignation to one or more video signals.

In the above embodiments, it will be understood that the trigger event could cause an automatic display to the resident, for example, an automatic channel change in the resident's TV to the channel or input for the video signal if the CLID received is recognized as the access control panel 28. Alternatively, the trigger could initiate a pop-up window on the resident's TV providing them with the option to view the video signal. For example, the resident could receive the following pop up on their STB "Do you want to see who is at the front door? Yes or No". Further alternatively, the resident could receive a pop-up asking them for a channel change in order to view the feed from the CCTV camera 24. For example "Turn to channel 99 to view front lobby".

It will also be understood that the systems and methods herein are not limited to an STB or devices described herein. The systems and methods can be applied to any device that has browser-like capabilities. The video signal can be streamed to other devices in the same manner as it would for the STB with the trigger resulting in either automatic or optional viewing via a pop up or the like.

Further, it will also be understood that the systems and methods herein could be applied to other access request systems, including for single dwelling units. In this case, a door bell may be used as a trigger event to initiate a video signal on a device.

It will be understood that the systems and methods described herein may be embodied in software or hardware or some combination thereof. Similarly, the system may be provided in and/or the method may be performed by existing components of the video device, such as a processor (not shown) and input/output ports (not shown).

It should be understood that various modifications can be made to the exemplary embodiments described and illustrated herein, without departing from the general scope of the appended claims. In particular, it should be understood that while the embodiments have been described for set top boxes, computers and the like, the embodiments are generally applicable to devices having capability of receiving a trigger event and a related display.

We claim:

1. A method for delivering a video signal associated with an access request, the method comprising:
    detecting a trigger event associated with the access request at a video device, wherein the detecting a trigger event comprises:
        detecting a ring tone on a telephone line at the video device;
        detecting a caller identification for the call associated with the ring tone at the video device;
        determining, at the video device, if the caller identification for the call matches with a caller identification of an access control panel associated with the access request; and
    if there is a match:
        accessing a video signal related to the trigger event and captured by a camera;
        integrating the video signal in a dedicated channel of a digital television feed; and
        displaying the video signal via the video device.

2. A method according to claim 1, further comprising, prior to outputting the video signal, notifying a user of the availability of the video signal and providing an option to display the video signal.

3. A method according to claim 2, wherein the notification further comprises instructions for the user to access the display of the video signal.

4. A method according to claim 1, wherein the accessing a video signal comprises changing to a channel related to the video signal.

5. A method according to claim 1, wherein the accessing a video signal comprises connecting to a predetermined streaming video.

6. A method according to claim 1, wherein the displaying the video signal via the video device comprises outputting the video signal to a display device associated with the video device.

7. A system for delivering a video signal associated with an access request, the system comprising:
- a trigger module, at a video device, configured to detect a trigger event associated with the access request, wherein the trigger module is configured to detect a trigger event by:
  - detecting a ring tone on a telephone line at the video device;
  - detecting a caller identification for the call associated with the ring tone at the video device; and
  - determining, at the video device, if the caller identification for the call matches with a caller identification of an access control panel associated with the access request;
- a video module configured to access a video signal captured by a camera and related to the trigger event; and
- a control module configured to control the video module to access the video signal based on the trigger event and for integrating the accessed video signal in a dedicated channel of a digital television feed where there is a match between the caller identification for the call and the caller identification of the access control panel.

8. A system according to claim 7, wherein the control module is further configured to, prior to outputting the video signal, notify a user of the availability of the video signal and provide an option to output the video signal.

9. A system according to claim 8, wherein the notification further comprises instructions for the user to access a display of the video signal.

10. A system according to claim 7, wherein the video module is configured to access a video signal by changing to a channel related to the video signal.

11. A system according to claim 7, wherein the video module is configured to access a video signal by connecting to a predetermined streaming video.

12. A system according to claim 7, wherein the control module is configured to display the video signal by outputting the video signal from the video module to a display device associated with a video device.

13. A set top box comprising the system of claim 7.

14. A mobile phone comprising the system of claim 7.

15. A computing device comprising the system of claim 7.

16. A non-transitory computer readable medium comprising instructions, which, when executed on a computing device, cause the computing device to perform the method comprising:
- detecting a trigger event associated with the access request at a video device, wherein the detecting a trigger event comprises:
  - detecting a ring tone on a telephone line at the video device;
  - detecting a caller identification for the call associated with the ring tone at the video device;
  - determining, at the video device, if the caller identification for the call matches with a caller identification of an access control panel associated with the access request; and
- if there is a match:
  - accessing a video signal related to the trigger event and captured by a camera;
  - integrating the video signal in a dedicated channel of a digital television feed; and
  - displaying the video signal via a video device.

17. A non-transitory computer readable medium according to claim 16, wherein the instructions further comprise, prior to outputting the video signal, notifying a user of the availability of the video signal and providing an option to display the video signal.

18. A non-transitory computer readable medium according to claim 17, wherein the notification further comprises instructions for the user to access the display of the video signal.

\* \* \* \* \*